Figure 4:
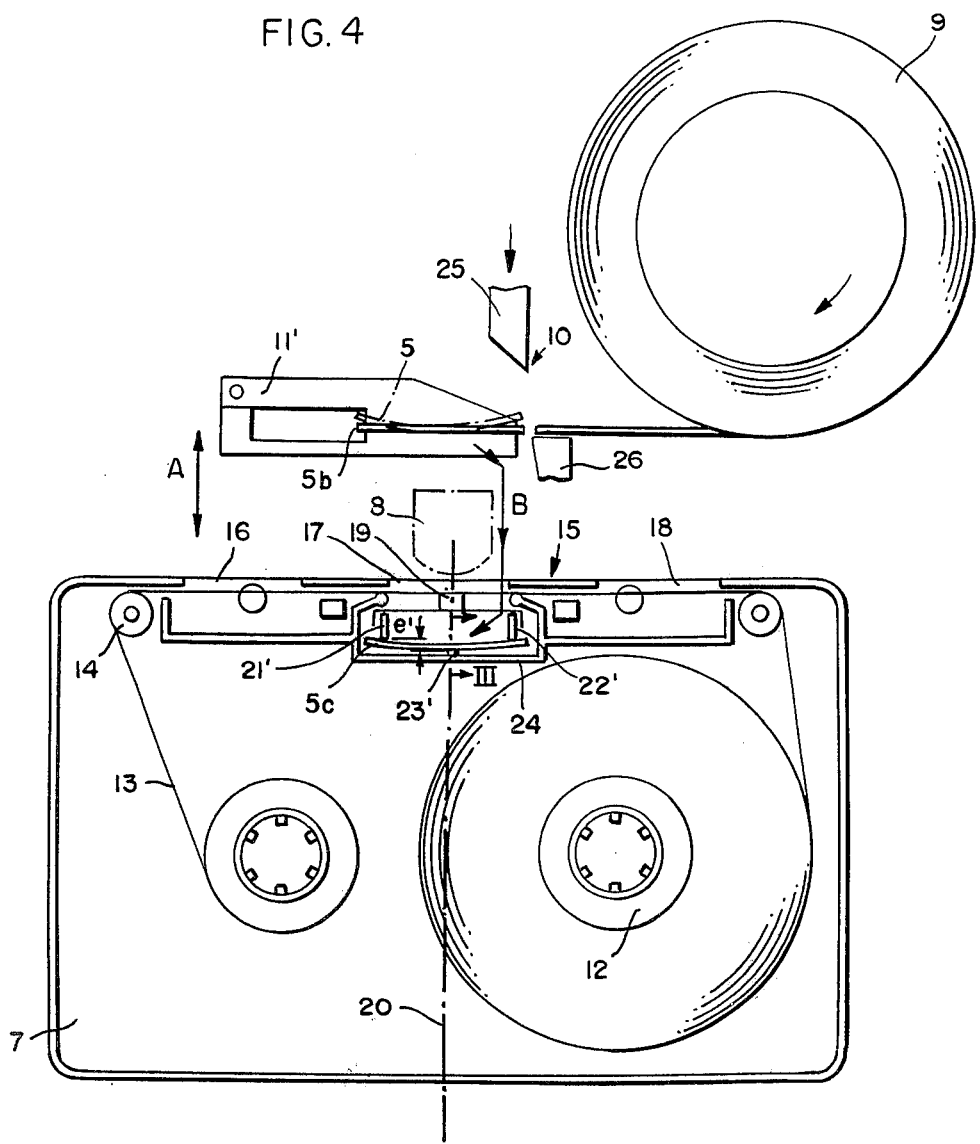

United States Patent [19]

Gaiser et al.

[11] 4,011,593
[45] Mar. 8, 1977

[54] MAGNETIC TAPE CASSETTE WITH SCREENING SHIELD

[75] Inventors: Dieter Gaiser, Diersheim; Eberhard Koester, Frankenthal; Klaus Schoettle, Ludwigshafen; Friedrich Guenther, Willstaett, all of Germany

[73] Assignee: BASF Aktiengesellschaft, Ludwigshafen (Rhine), Germany

[22] Filed: Apr. 23, 1975

[21] Appl. No.: 570,519

Related U.S. Application Data

[63] Continuation-in-part of Ser. No. 462,530, April 19, 1974, abandoned.

[30] Foreign Application Priority Data

Apr. 21, 1973 Germany .................. 2320439

[52] U.S. Cl. .............. 360/132; 226/198; 242/199; 360/96; 360/130
[51] Int. Cl.² .............. G11B 23/04; G11B 15/60
[58] Field of Search .......... 360/132, 131, 130, 134, 360/85, 92, 93, 96, 128; 226/196, 198; 242/197, 199

[56] References Cited

UNITED STATES PATENTS

| | | |
|---|---|---|
| 3,495,787 | 2/1970 | Wallace .................. 360/132 |
| 3,789,157 | 1/1974 | Greiner et al. .......... 360/132 |
| 3,796,394 | 3/1974 | Souza ..................... 360/132 |
| 3,851,115 | 11/1974 | Zacaroli .................. 360/130 |

*Primary Examiner*—Alfred H. Eddleman
*Attorney, Agent, or Firm*—Johnston, Keil, Thompson & Shurtleff

[57] ABSTRACT

The invention relates to a magnetic tape cassette with a screening shield which is easy to produce and to insert into the cassette and which exhibits a better screening effect than known shields. The screening shield consists of a strip of flexible "soft" magnetic material which is bent into arcuate shape prior to insertion into the cassette and held in the cassette in straightened or bowed shape under flexural stress by suitably designed holding means in the cassette.

8 Claims, 6 Drawing Figures

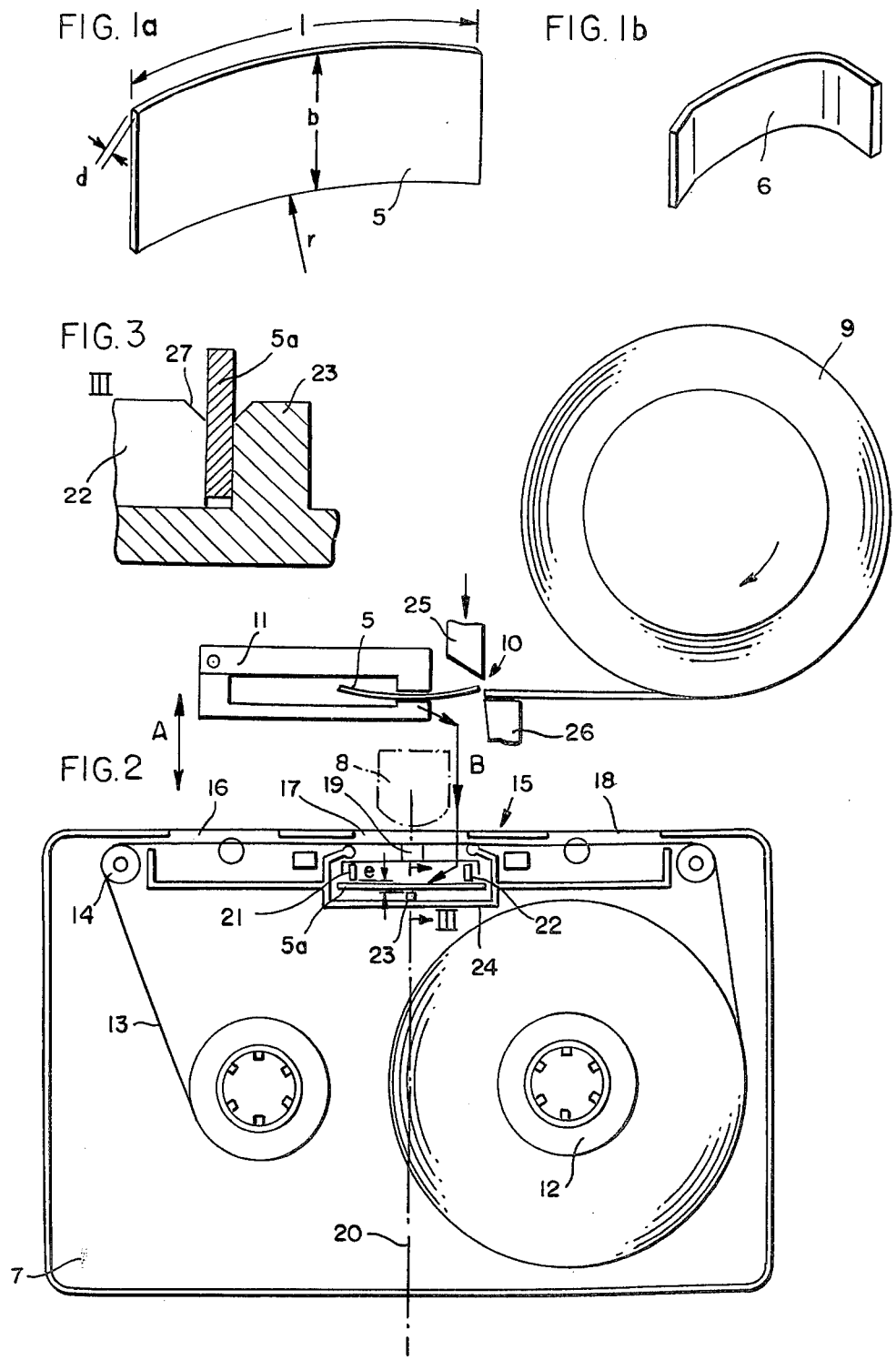

MAGNETIC TAPE CASSETTE WITH SCREENING SHIELD

This is a Continuation-in-Part of our application Ser. No. 462,530, filed Apr. 19, 1974, now abandoned.

This invention relates to a magnetic tape cassette, a screening shield for the cassette and a method of producing screening shields and of inserting the shields into cassettes.

Conventional magnetic tape cassettes contain flat screening shields, the ends of which are bent perpendicular to their surface. These shields usually consist of "soft" magnetic material containing varying amounts of nickel, usually 56 or 70% of nickel (mumetal). These prior art screening shields are manufactured by cutting up lengths of suitable strip material followed by punching, bending and optional annealing. The insertion of the screening shield into the cassette during assembly of the latter is carried out manually or automatically. In these prior art magnetic tape cassettes, the holding means for the screening shield consist of recesses and projections on the lower and upper cassette parts by means of which the shield is held relatively loosely. During assembly of these conventional cassettes, especially when the top portion of the cassette is placed in position, the screening shields frequently drop out, necessitating extra work and increasing the number of rejects.

An object of the present invention is to eliminate the drawbacks of the prior art designs of magnetic tape cassettes and screening shields and to simplify, and make more reliable and economic, the methods of producing screening shields and of inserting them into cassettes.

According to the invention, in a magnetic tape cassette, especially a compact cassette, comprising upper and lower housing parts having side walls, the front wall being provided with an entry aperture for a magnetic head associated with a recording/playback apparatus and, facing this aperture, a screening shield secured in the cassette housing by holding means, the screening shield is characterized in that it consists of a strip of flexible "soft" magnetic material which, prior to insertion into the cassette housing, is of arcuate shape and, after insertion into the housing, is of straightened shape, the screening shield being held in its straightened shape by the holding means under flexural stress.

The great advantage of a magnetic tape cassette of this type is that it is easier to manufacture, since the inserted screening shield is firmly retained during assembly of the cassette, so that the shield always stays in the correct position and additional work in connection with incorrectly inserted shields can be avoided.

In an advantageous embodiment of the invention, the shield-holding means comprise at least three retaining elements arranged in the cassette symmetrically with respect to the entry aperture for the magnetic head, these elements being spaced apart by a distance equal to, or slightly greater than, the thickness of the metal strip constituting the screening shield.

Effective support of the screening shield is thus obtained in a simple manner, so that the shield is reliably held in a fixed position.

In a preferred embodiment of the cassette of the invention, the holding means may be provided exclusively on the lower part of the cassette housing, resulting in completely trouble-free handling of the lower part during assembly of the cassette.

The screening shield of the invention consists of a piece of magnetically "soft" material which, prior to insertion into the cassette, is of arcuate shape with a preferred radius of curvature between 150 and 300 mm. There is thus obtained a screening shield which is extremely easy to manufacture and very easy to insert into the cassette during assembly of the latter and which is largely self-locating.

A particularly preferred material for the screening shield is a "soft" magnetic material with a nickel content of approximately 36%. In addition to the shield's other obvious advantages, it is possible with this material to achieve a very economic shield design while obtaining the same screening effect as conventional designs.

A very advantageous method of manufacturing the screening shields of the invention consists in cutting sections of approximately uniform length from a coil of mumetal strip material, after annealing the coil. The screening shields obtained are ready for use without the need for conventional costly punching, bending and annealing operations.

With this method it is possible to reduce the number of costly conventional individual steps required for the manufacture and insertion of prior art screening shields into cassettes to a minimum, so that a considerable cost saving can be achieved in the mass production of magnetic tape cassettes.

Figure 5:
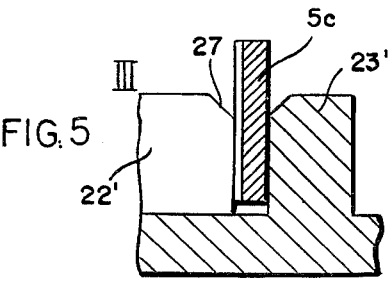

Details of the invention will now become apparent from the following description of an embodiment thereof. The drawings show in FIGS. 1a and b examples of designs of screening shields according to the invention;

in FIG. 2 an apparatus according to the invention for inserting the screening shields of the invention into the lower parts of compact cassettes;

in FIG. 3 a section along line III of the lower part of the cassette of FIG. 2;

in FIG. 4 a preferred embodiment of the apparatus of FIG. 2 with a preferred embodiment of a compact cassette of the invention; and in FIG. 5 a section along line III of the lower part of the cassette of FIG. 4.

A piece of magnetically "soft" material 5 for a screening shield is characterized by its bent (e.g. arcuate) shape. The radius of curvature $r$ of the piece 5 may be chosen as required. Preferably, the radius of curvature $r$ is between 150 and 300 mm, since every piece 5 is a section of a coil of strip material, as will be further described hereinafter, so that screening shields originating from pieces forming the outer turns of the coil have a larger radius of curvature, approximately 300 mm, whereas pieces 5 cut from the inner turns of the coil have a smaller radius of curvature of about 150 mm. However, the radius of curvature to be used depends primarily on the design and arrangement of the retaining elements employed in the cassette. The thickness $d$ of the piece 5 is preferably between 0.2 and 0.4 mm and its width $b$, 8 to 10 mm. Its length $l$ depends upon the design of the magnetic tape cassette for which the shield is intended. For compact cassettes, the length $l$ is 22 mm. The piece 5 for the screening shield consists of an annealed "soft" magnetic material containing about 36% of nickel. The screening effect of such a shield is equal to that of a conventional screening shield in prior art compact cassettes. It would also be possible, of course, to use a material with a different nickel content. The material chosen in the present case, however, ensures a low-cost magnetic shield which, moreover, exhibits a good screening effect. FIG. 1b shows a differently shaped piece 6 for a screening shield, the piece 6 also being un-stressed and the ends being slightly angled toward the center. This is to show that other designs are also possible.

It is important that the shield should consist of a material which is resiliently deformable, especially by bending. The above-mentioned "soft" magnetic material of about 36% nickel content meets this requirement very effectively. By "resiliently deformable" we mean that deformation of the piece 5 or 6 should only take place within the elastic limits of the material, so that forces counteracting the deformation are present after the piece has been deformed.

A device for inserting the curved pieces of magnetically "soft" material is shown diagrammatically in FIG. 2. Individual parts of this device are a rotatably supported coil 9 of strip material, a device 10 for cutting the strip material into pieces 5 and a movable gripping device 11 which holds and inserts the pieces 5 into a lower housing part 7 of a compact cassette (with a magnetic head 8 indicated by dotted lines) to form screening shields 5a.

The lower part 7 has winding hubs 12 rotatably supported thereon, with a magnetic tape 13 wound therearound. The magnetic tape 13 is guided via idler rolls 14 to run parallel with the front wall 15 of the lower part 7 of the cassette. Apertures 16–18 allow a recorder-associated pressure roller (not shown) and the magnetic head 8 to enter the housing. The usual felt pressure pad 19 is arranged behind the aperture 17 for the magnetic head 8 (behind the magnetic tape 13). As usual, the screening shield 5a for screening off the magnetic head 8 from stray magnetic fields is arranged symmetrically with respect to the transverse central axis 20 of the lower cassette part. In the cassette part 7, the screening shield 5a is clamped between lateral retaining elements 21 and 22 and a central retaining element 23, since the distance e (between the elements 21, 22 on the one hand and the element 23 on the other hand) corresponds to the thickness d of the screening shield. The central retaining element 23 is advantageously integral with a bridge-like member 24 on the lower cassette part, whereas the elements 21 and 22 are projections molded integral with the lower part of the cassette housing. The retaining elements 21–23 constitute the holding means for the screening shield 5a and are arranged symmetrically with respect to the transverse central axis 20 of the lower housing part. The shield 5a within the cassette 7 is now straight which means that since the piece 5 was of arcuate shape prior to insertion into the cassette part 7 (see FIGS. 1a and 1b), it is now under flexural stress and thus bears against the retaining elements 21–23 (cf. FIGS. 2 and 3). These elements like the lower parts of the cassettes are injection-molded from a suitable plastics material. Prior to the operation of inserting the piece 5, the coil 9 is unwound and cut by means of the cutting device 10 into pieces of suitable length which are held by the gripping device 11 and, owing to a movement of the latter in the direction of the lower arrow of double arrow A, taken along the path indicated by arrows B and inserted in the cassette part 7. FIG. 3 shows a section of the cassette part 7 along line III and clearly illustrates the position of the screening shield 5a between the retaining elements 22 and 23. The bevelled edges 27 facilitate the insertion, effected under pressure exerted by the gripping device 11, of the screening shield 5a which has been held by the gripping device 11 and inserted in the above-described manner. Between the gripping members of the gripping device 11, the piece 5 is shown in the bent shape it assumes immediately after it has been cut from the coil 9 by the cutting device 10. After the inserting operation, the inner vertical edges of the retaining elements 21–23 ensure the necessary stressing of the shield 5a, so that the latter retains its straightened shape between and in contact with the said retaining elements. This insertion method has proved to be very effective in practice because it is distinguished by high speed and reliability. Devices which ensure that sections of uniform length are obtained and which control the gripping device 11 may be of a suitable design but form no part of the present invention. It is important, however, that the cutting device 10, in the form of a cutter 25 and a counterabutment 26, should cut off the piece of strip metal so as not to impair the magnetic properties of the sections, or at least to impair them as little as possible. The slight loss of screening efficiency which may be incurred in this operation is at least compensated for by the annealing process. As shown in FIG. 4, the gripping device 11' is designed in such a way that it straightens the piece 5 prior to insertion in the cassette. The force which straightens the piece 5 must continue to act thereon until it has been inserted between the retaining elements in cassette part 7. In FIG. 4 the piece 5 is shown in the bent shape (cf. dotted lines) it assumes immediately after it has been cut from the coil 9. The straightened piece 5 b (cf. solid lines) is shown between the gripping members of the gripping device 11'. After the piece 5b has been inserted in the cassette, it assumes a slightly bowed shape and in this form constitutes the shield 5c. Shield 5c is held in its bowed shape by retaining elements 21', 22' and 23', the distance e' between the elements 21' and 22' on the one hand and the element 23' on the other hand being slightly greater than the distance e in FIG. 2. FIG. 5 is a schematic cross-sectional view showing the position of shield 5c between the retaining elements 22' and 23'. As is clear from FIG. 4, the inner vertical edges of the retaining elements ensure the necessary stressing of the shield 5c since it bears against the said retaining elements. Between the coil 9 and the cutting device 10, a suitable cleaning station for the strip material may be provided if necessary. The cutting of the pieces for the screening shields immediately prior to their insertion into the cassette housing parts has obvious advantages as regards labor and equipment costs. Another significant advantage, when using coiled strip material, is that the annealing process need not be performed on the individual shaped shields — the conventional practice — but can now be performed on the entire coil. The temperatures employed in this heat treatment are usually between 600° and 1100° C. In order to prevent adjacent layers of strip material from fusing together during the annealing operation or from suffering superficial damage, a strip of suitable protective material which avoids these detrimental effects can be interposed between the turns of the coil.

The above-described retaining elements 21–23 and 21'–23' for the screening shield 5a and 5c, respectively, are usually provided exclusively on the lower part 7 of the cassette. However, it would also be possible to provide congruent retaining elements on the lower and the upper parts of the cassette housing which cooperate as retaining elements 21–23 and 21'–23' after the housing parts have been brought together. The height and rigidity of the retaining element on the lower part into which the individual cassette components are usually inserted before the upper part is placed in position would in that case have to be so dimensioned that the shield is fixedly held and the retaining elements are not fractured. The designing of the retaining elements and screening shields in the abovedescribed way ensures that the screening shield is not lost or displaced, not only during assembly of the cassette, but also in the finished cassette, and that the need for additional work, therefore, does not arise and the number of rejects is decreased. Faulty recording and reproduction, caused by an incorrectly positioned screening shield, is also substantially avoided.

Although the above description refers to an inserting device, immediately following the manufacture of a piece for the screening shield, the invention is not so limited. The shieldproducing method of the invention offers economic advantages even if the manufacture of the piece for the shield and its insertion remain separate operations.

We claim:

1. A magnetic tape cassette, especially a compact cassette, comprising lower and upper cassette housing parts having side walls, the front wall being provided with an entry aperture for a magnetic head associated with a recording/playback apparatus and, facing this aperture, a screening shield secured in the cassette housing by holding means, wherein the screening shield is in the form of an arcuately shaped strip of resiliently deformable "soft" magnetic material, and wherein there are provided means, including said holding means, which incident to the insertion of the strip into the cassette housing flex said strip into a shape of reduced arcuity and after said insertion hold the strip in the last-mentioned shape under flexural stress, said holding means comprising members bearing against two longitudinally spaced portions of said strip from one side and against a portion of said strip intermediate said spaced portions from the other side.

2. A magnetic tape cassette according to claim 1, wherein said members comprise at least three retaining elements arranged symmetrically with respect to the entry aperture for the magnetic head, there being a gap for receiving the screening shield between the said retaining elements whose width at least corresponds to the thickness of the screening shield.

3. A magnetic tape cassette according to claim 1, wherein the holding means are provided exclusively on said lower part of the cassette housing.

4. A screening shield for employment in a magnetic tape cassette as claimed in claim 1 wherein said screening shield comprises a strip of "soft" magnetic material having substantially circular curvature prior to its insertion into the cassette housing.

5. A screening shield according to claim 4 wherein the magnetic strip prior to its insertion into the cassette housing, is shaped in such a way that it forms a section of a circular arc having a radius of curvature between 150 and 300 millimeters.

6. A screening shield according to claim 4, in which the strip consists of an annealed "soft" magnetic material of about 36% nickel content.

7. A screening shield according to claim 6, in which the strip consists of mumetal of about 36% nickel content.

8. A magnetic tape cassette, especially a compact cassette, comprising lower and upper cassette housing parts having side walls, the front wall being provided with an entry aperture for a magnetic head associated with a recording/playback apparatus and, facing this aperture, a screening shield, wherein the screening shield is in the form of a strip of resiliently deformable "soft" magnetic material, said strip being resiliently biased so as to assume a shape of predetermined arcuity when unrestrained, and wherein there are provided in said cassette means for securing said resiliently biased strip, upon its insertion into said cassette, in a shape of reduced arcuity under flexural stress.

* * * * *